(12) United States Patent
Youden

(10) Patent No.: US 7,027,035 B2
(45) Date of Patent: Apr. 11, 2006

(54) IMAGE COPY TO A SECOND DISPLAY

(75) Inventor: John J Youden, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 439 days.

(21) Appl. No.: 10/265,837

(22) Filed: Oct. 7, 2002

(65) Prior Publication Data

US 2004/0070553 A1    Apr. 15, 2004

(51) Int. Cl.
*G09G 5/00* (2006.01)

(52) U.S. Cl. ............... 345/169; 345/1.1; 345/901; 345/905

(58) Field of Classification Search ............. 455/556.1, 455/556.2, 566, 574, 575.1; 345/1.1, 169, 345/204, 1.2, 1.3, 156, 173, 100, 905, 13, 345/901; 361/683
See application file for complete search history.

(56) References Cited

U.S. PATENT DOCUMENTS

| | | | |
|---|---|---|---|
| 5,508,720 A * | 4/1996 | DiSanto et al. ............. 345/169 |
| 5,592,361 A | 1/1997 | Smith et al. | |
| 5,850,209 A | 12/1998 | Lemke et al. | |
| 6,017,584 A | 1/2000 | Albert et al. | |
| 6,107,997 A * | 8/2000 | Ure ............... 345/173 |
| 6,115,618 A * | 9/2000 | Lebby et al. ............... 455/566 |
| 6,118,413 A | 9/2000 | Bril et al. | |
| 6,124,851 A | 9/2000 | Jacobson | |
| 6,295,038 B1 * | 9/2001 | Rebeske ............. 345/1.1 |
| 6,633,759 B1 * | 10/2003 | Kobayashi ............. 455/566 |
| 6,859,219 B1 * | 2/2005 | Sall ............... 345/1.1 |
| 2001/0019326 A1 * | 9/2001 | Yuasa ............. 345/204 |
| 2002/0030638 A1 | 3/2002 | Weiner | |
| 2002/0109662 A1 * | 8/2002 | Miller ............. 345/100 |
| 2002/0154473 A1 * | 10/2002 | Sellers ............. 361/683 |
| 2003/0050059 A1 * | 3/2003 | Tsukamoto ............. 455/566 |
| 2003/0125081 A1 * | 7/2003 | Boesen ............. 455/556 |
| 2004/0067770 A1 * | 4/2004 | King et al. ............. 455/557 |

* cited by examiner

*Primary Examiner*—Bipin Shalwala
*Assistant Examiner*—David L. Lewis

(57) ABSTRACT

A computer system includes a first display device to display an image and includes an application program to copy the image displayed on the first display device to a second display device. A selectable control, when selected, initiates that the application program copy the image displayed on the first display device to the second display device.

31 Claims, 4 Drawing Sheets

IMAGE COPY TO A SECOND DISPLAY

TECHNICAL FIELD

This invention relates to information display and, in particular, to image copy to a second display.

BACKGROUND

A computer can be connected to two display devices, such as a desktop personal computer connected to two monitors or a laptop computer with an integrated LCD display and connected to a second monitor. Additionally, a laptop computer having a second display on the other side of the first display is difficult to use in traditional modes because it is not readily visible to a user of the device. Connecting a computer to two display devices typically requires two display drivers in the computer.

Each display connected to a computer can be configured to display a different application, such as a text editor on one display and a Web page on the other. However, it is not intuitive to a user how to setup two different displays driven with a single computer. Conventionally, a user can drag a display icon from the first display in the direction of the second display, or the second display can be accessed as a second device. Further, when the computer is shut down, the information displayed on the two displays is not available for reference by the user until the computer is again turned on and the displays are established.

SUMMARY

In an implementation, a computer system includes a first display device to display an image and includes an application program to copy the image displayed on the first display device to a second display device. A selectable control, when selected, initiates that the application program copy the image displayed on the first display device to the second display device.

In one implementation, a portable computing device includes a display device and a non-volatile display device. A selectable control, when selected, initiates that an application program copy the image displayed on the display device to the non-volatile display device such that the image is maintained for display without power applied.

BRIEF DESCRIPTION OF THE DRAWINGS

The same numbers are used throughout the drawings to reference like features and components.

DETAILED DESCRIPTION

Image copy to a second display is described in one implementation as a computer system that includes a first display device to display an image and an application program to copy the image displayed on the first display device to a second display device. A selectable control, when selected, initiates that the application program copy the image displayed on the first display device to the second display device.

In another image copy to a second display implementation, a portable computing device includes a display, such as an LCD, integrated into a first side of a housing lid for the computing device. The housing lid also includes a non-volatile display integrated into a second side of the housing lid. The non-volatile display is viewable when the housing lid is positioned over the housing base of the computing device, such as when the housing lid is folded down over the housing base. The portable computing device also includes a selectable control such as a push-button or programmable keyboard input that, when selected, initiates an application program to copy an image displayed on the display to the non-volatile display such that the image is maintained for display without power applied to the non-volatile display.

The portable computing device with the non-volatile display provides that an image, such as a daily schedule, a photograph, a phone number directory, a map, identification information associated with the computing device and/or a user of the device, or any other combination of text and picture images, is maintained and viewable when the computer is shut-down and folded for transport. The viewable non-volatile display is a quick information reference for any traveler, business person, driver of a vehicle, and the like. Further, the information displayed on the non-volatile display is customizable as any combination of text and picture images for each individual as needed. A user of the portable computing device can select and customize the reference information on the first display device, initiate the image copy application, and have the selected information available for viewing on the non-volatile display after shutting down the computing device.

Exemplary Image Copy System

Figure 1:
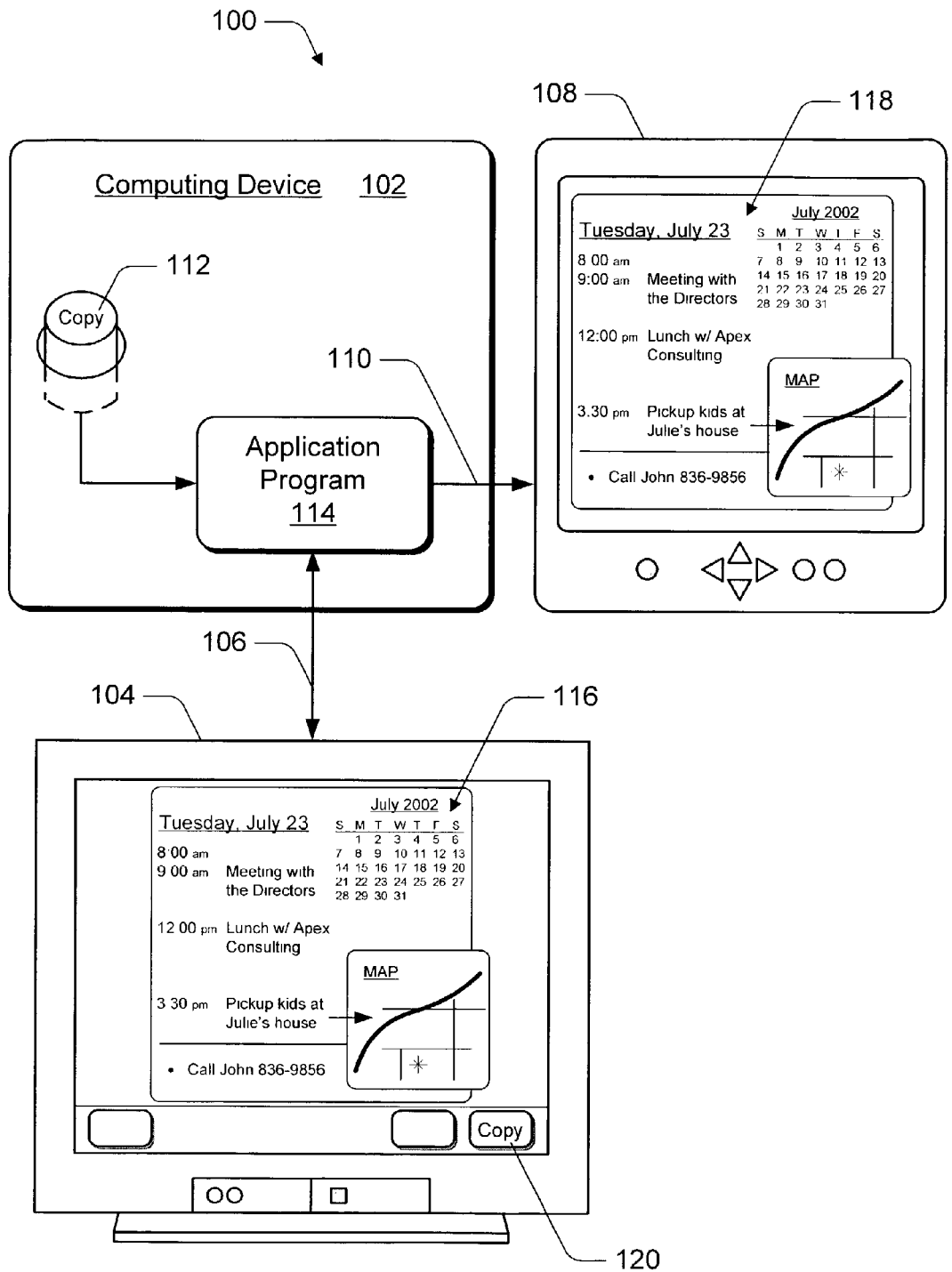
FIG. 1 illustrates various components of an exemplary image copy system.

FIG. 1 illustrates various components of an exemplary image copy system 100 in which image copy to a second display can be implemented. Image copy system 100 includes a computing device 102 connected to a first display device 104 via an image data transfer link 106, and the computing device 102 connected to a second display device 108 via an image data transfer link 110. In an implementation, computing device 102 can be a portable computer with an integrated display, such as an LCD, and a second integrated display or connected to a second independent display.

Computing device 102 includes a selectable control 112 that, when selected by a user of the device, initiates an application program 114 to copy an image 116 displayed on the first display device 104 to the second display device 108. The copy of image 116 is identified as image 118 on the second display device 108. The selectable control 112 can be implemented as a push-button on computing device 102, as a programmed keyboard input, as a selectable interface control 120 displayed on the first display device 104, or as any other type of selectable control.

As an alternative to application program 114 copying the image 116, the second display device 108 can be implemented to acquire the display signals communicated from a display controller (not shown) in computing device 102 which is utilized to generate display data for both the first display device 104 and for the second display device 108. This provides a low-cost and straightforward method to implement image copy to a second display with a single display controller for both display devices if the electrical signal format for both of the display devices is the same.

Exemplary Computing Device

Figure 2:
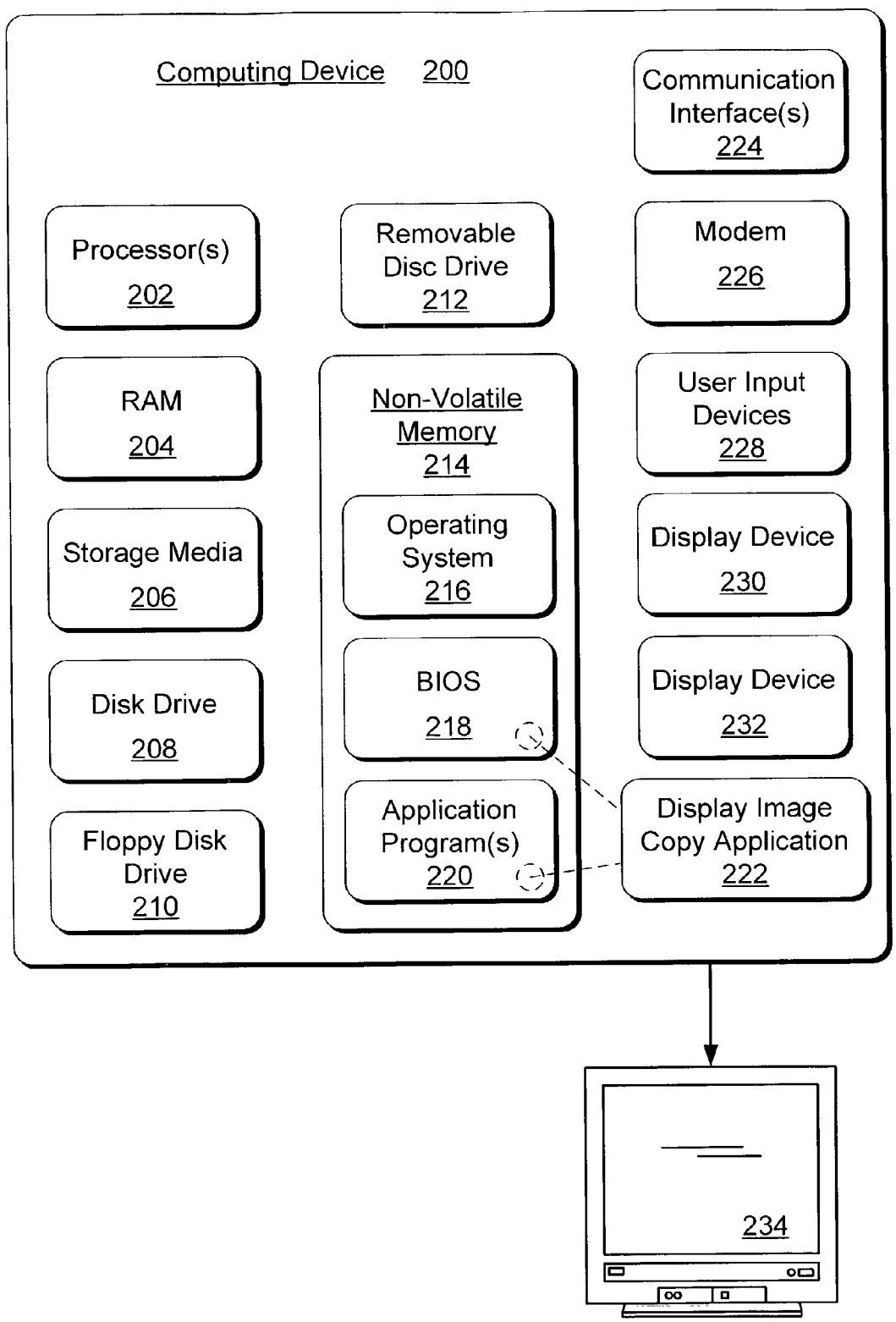
FIG. 2 is block diagram that illustrates various components of an exemplary computing device.

FIG. 2 illustrates various components of an exemplary computing device 200 that can be utilized to implement image copy to a second display. Computing device 200 includes one or more processors 202 (e.g., microprocessors) which process various instructions to control the operation of computing device 200 and to communicate with other electronic and computing devices.

Computing device 200 can be implemented with one or more memory components, examples of which include a random access memory (RAM) 204, an internal or external storage media 206, a disk drive 208, a floppy disk drive 210, a removable disc drive 212 (e.g., one of any CD and/or DVD formatted media standards), and a non-volatile memory 214 (e.g., ROM, Flash, EPROM, EEPROM, etc.) all of which provide data storage mechanisms for computing device 200.

An operating system 216, BIOS 218, and one or more application programs 220 can be stored in non-volatile memory 214 and executed on a processor 202 to provide a runtime environment. A runtime environment facilitates extensibility of computing device 200 by defining interfaces that allow the one or more application programs 220 to interact with computing device 200. Examples of application programs 220 that can be implemented in computing device 200 include a Web browser (e.g., "World Wide Web"), an email program to facilitate electronic mail, and so on.

Further, a display image copy application 222 can be stored in non-volatile memory 214 and can be implemented as a software component of the BIOS 218 or as one of the application programs 220 that execute on a processor 202. The display image copy application 222 implements image copy to a second display. Although display image copy application 222 is illustrated and described as a single application configured to perform several functions of image copy to a second display, the display image copy application 222 can be implemented as several component applications distributed to each perform one or more functions in computing device 200.

Computing device 200 further includes one or more communication interfaces 224 and a modem 226 that each provide a mechanism for computing device 200 to communicate with other electronic and computing devices. A communication interface 224 can be implemented as a serial and/or parallel interface, a universal serial bus (USB) interface, a wireless interface, as any one of many network interfaces, and/or as any other type of communication interface. A wireless interface enables computing device 200 to receive input commands and communicate information via infrared (IR), 802.11, Bluetooth, or similar RF communication link. A network interface allows devices coupled to a common data communication network to communicate information with computing device 200. Similarly, a serial and/or parallel interface provides a data communication path directly between computing device 200 and another electronic or computing device.

Computing device 200 has integrated and/or external user input devices 228 which can include a keyboard, mouse, pointing device, and/or other input devices to interact with, and to input information to computing device 200. Computing device 200 may also communicate with and/or receive input information from other handheld input devices such as a personal digital assistant (PDA), handheld computer, wireless phone, and the like.

Computing device 200 can include a display device 230, such as an integrated LCD for a portable or laptop computer, for a personal digital assistant (PDA), or for a similar mobile computing device. Computing device 200 may also include a second integrated display device 232 and/or be connected to an external display device 234.

Although not shown, a system bus typically connects the various components within computing device 200. A system bus can be implemented as one or more of any of several types of bus structures, including a memory bus or memory controller, a peripheral bus, an accelerated graphics port, or a local bus using any of a variety of bus architectures.

General reference is made herein to computing device 200 and, although specific examples refer to a portable, or otherwise mobile, computing device having particular functionalities, such examples are not meant to limit the scope of the claims or the description, but are meant to provide a specific understanding of the described implementations. Furthermore, the described components of computing device 200 and the portable computing devices are merely exemplary, and are not intended to limit application of the claimed subject matter to devices that include only these components. Accordingly, other devices having components different from and/or in addition to those described herein can be used in implementing the described techniques and systems.

Exemplary Portable Computing Device

Figure 3:
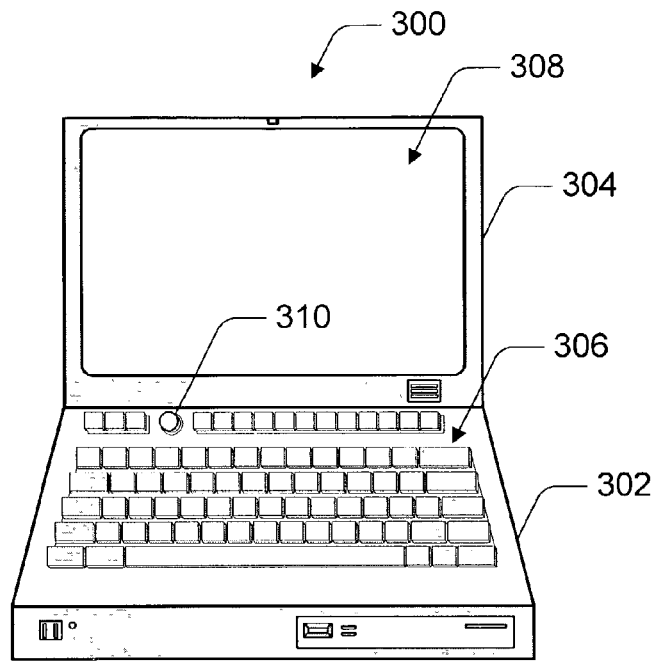
FIG. 3 illustrates an exemplary portable computing device configured for an implementation of image copy to a second display.

FIG. 3 illustrates an example of a portable computing device 300 which can include one or more of the components of the exemplary computing device 200 (FIG. 2). Portable computing device 300 has a housing base 302 and a housing top 304 which are coupled together via a hinge or other flexible joint (not shown) to permit housing top 304 to fold down over housing base 302. A keyboard assembly 306 is mounted within housing base 302 and a flat panel display 308 is mounted within housing top 304.

A selectable control 310 is shown as a push-button in housing base 302. When selected, or otherwise pushed by a user of the portable computing device 300, display image copy application 222 (FIG. 2) is initiated to copy an image displayed on the flat panel display 308 to a second display device integrated into the housing top (shown in FIG. 4). As described above, the selectable control to initiate the display image copy application 222 can also be implemented as a programmed keyboard input with any one or combination of keys in keyboard assembly 306, or as a selectable interface control displayed on flat panel display 308.

Figure 4:
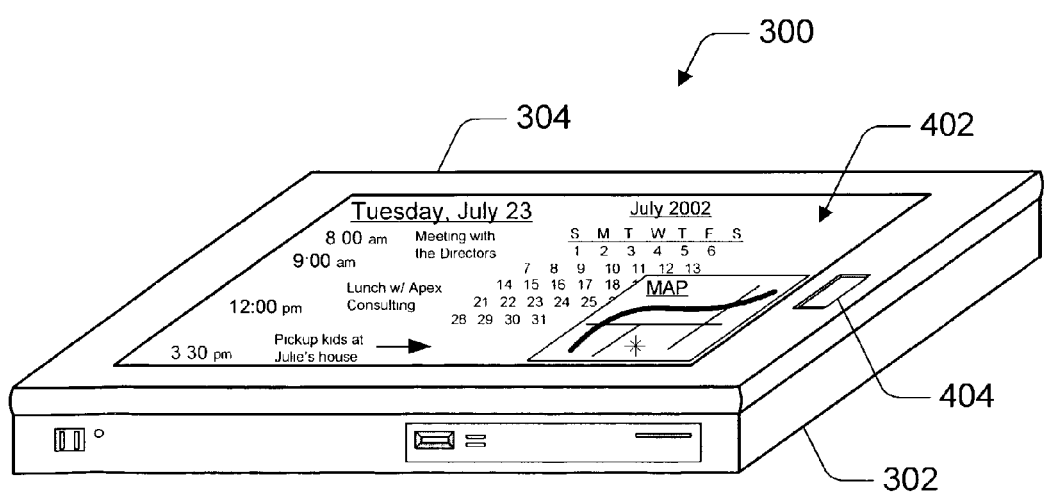
FIG. 4 further illustrates the exemplary portable computing device shown in FIG. 3.

FIG. 4 further illustrates portable computing device 300 with the housing top 304 positioned over the housing base 302 to show a second display device 402 integrated into the housing top 304. The second display device 402 is viewable when the housing top 304 is folded down over the housing base 302.

The second display device 402 can be implemented as a non-volatile display that maintains an image for display without power applied to the display device. Examples of a non-volatile display 402 are available from the E• Ink Corporation and are described by Jacobson in U.S. Pat. No. 6,124,851 and by Albert et al. in U.S. Pat. No. 6,017,584. Jacobson describes a page display that includes address lines and electronically addressable contrast media which may be bistable media such that text or images written to the page display can be maintained without the application of power.

Portable computing device 300 also includes a second selectable control 404 that is accessible when the housing top 304 is positioned over the housing base 302. When selected by a user of computing device 300, selectable control 404 initiates the display image copy application 222 (FIG. 2) to generate a second image for display on display device 402. Image data for the second image can be maintained by one or more of the memory components in exemplary computing device 200 (FIG. 2) and the image data can be retrieved for display.

Methods for Image Copy

Methods for image copy to a second display may be described in the general context of computer-executable instructions located in computer storage media, including memory storage devices. Generally, computer-executable instructions include routines, programs, objects, components, data structures, and the like that perform particular functions or implement particular abstract data types.

Figure 5:
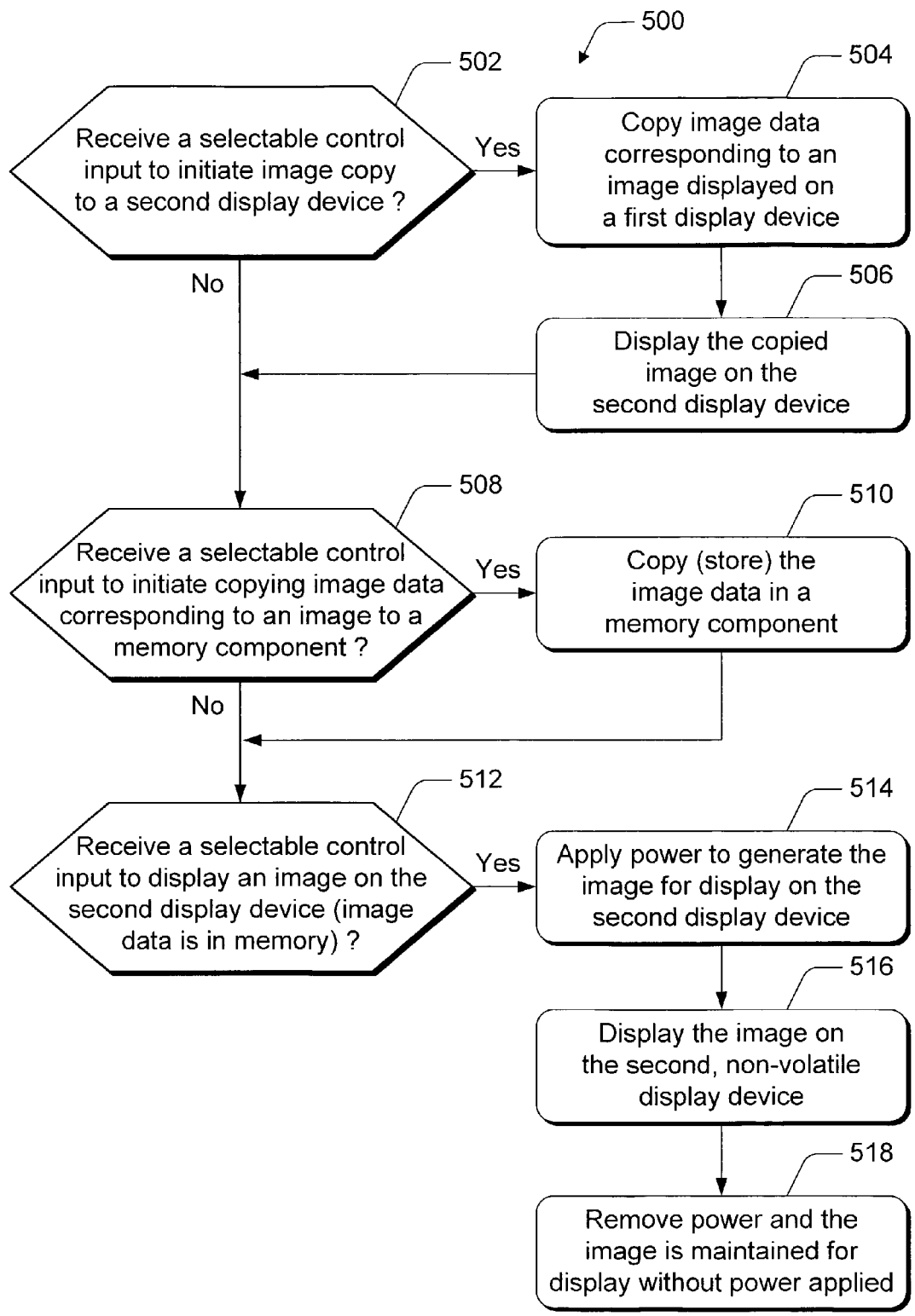
FIG. 5 is a flow diagram that illustrates a method for image copy to a second display.

FIG. 5 illustrates a method 500 for image copy to a second display. The order in which the method is described is not intended to be construed as a limitation, and any number of the described method blocks can be combined in any order to implement the method. Furthermore, the method can be implemented in any suitable hardware, software, firmware, or combination thereof.

At block 502, a selectable control input is received to initiate image copy to a second display device. For example, a user of computing device 102 (FIG. 1) initiates push-button selectable control 112 to initiate that application program 114 copy image 116 displayed on display device 104 to display device 108 which is shown as image 118. Selectable control 112 can be embodied as selectable interface control 120 displayed on display device 104, as push-button selectable control 310 in the housing base of portable computer 300 (FIG. 3), or as a programmed keyboard input with any one or combination of keys in keyboard assembly 306.

At block 504, image data corresponding to an image displayed on a first display device is copied. For example, display image copy application 222 (FIG. 2) copies, or otherwise reads, each bit of image data corresponding to image 116 displayed on the first display device 104. Alternatively, if the electrical signal format of the second display is the same as the first display device, then the "copy" operation may be implemented by enabling the secondary display to acquire the display signals (e.g., image data) communicated from a single display controller utilized by both the first and second displays. This provides a low-cost and straight-forward method to implement image copy to a second display.

At block 506, the copied image is displayed on the second display device. For example, display image copy application writes each bit of the image data to the second display device 108 to display image 118. Displaying the image data on the second display device includes maintaining the image for display without power applied. For example, non-volatile display 402 (FIG. 4) maintains the displayed image without power applied (i.e., after the power has been removed, or otherwise turned off).

At block 508, a selectable control input is received to initiate copying image data corresponding to an image displayed on the first display device to a memory component. For example, display image copy application 222 in computing device 200 (FIG. 2) can be implemented to copy each bit of image data corresponding to image 116 displayed on the first display device 104 (FIG. 1) to any one of the memory components in computing device 200. At block 510, the image data is copied, or otherwise stored, in a memory component.

At block 512, a selectable control input is received to display an image on the second display device, where image data corresponding to the image is maintained with a memory component. For example, a user of computing device 300 (FIG. 4) initiates selectable control 404 to initiate that display image copy application 222 read image data from a memory component in the computing device and display an image corresponding to the image data on non-volatile display 402.

At block 514, power is applied to generate the image for display on the second display device. For example, computing device 300 may be shut off with the housing top folded over the housing base as illustrated in FIG. 4 while non-volatile display 402 maintains the displayed image without power applied. When receiving the selectable control input to display a next image, power is applied to computing device 300 to facilitate retrieving the image data from a memory component and generating the image for display. At block 516, the image is displayed on the non-volatile display. At block 518, the power is removed and the image is maintained for display on the non-volatile second display device without power applied.

Conclusion

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A portable computing device, comprising:
   a housing base configured to house components of the portable computing device;
   a display housing coupled to the housing base, the display housing having at least a first side and a second side;
   a first display device integrated into the first side of the display housing and configured to display an image;
   a second display device integrated into the second side of the display housing such that the second display device is viewable when the display housing is closed over the housing base to obscure the first display device; and
   a selectable control configured to initiate that an application program copy the image displayed on the first display device for display on the second display device.

2. A portable computing device as recited in claim 1, wherein the second display device is a non-volatile display configured to maintain the image for display without power applied.

3. A portable computing device as recited in claim 1, wherein the application program is configured to copy each bit of image data corresponding to the image displayed on the first display device.

4. A portable computing device as recited in claim 1, further comprising a memory component configured to maintain image data, and wherein the application program is further configured to copy the image data corresponding to the image displayed on the first display device to the memory component.

5. A portable computing device as recited in claim 1, further comprising:
   a memory component configured to maintain a second image; and
   a second selectable control configured to initiate that the application program generate the second image for display on the second display device.

6. A portable computing device as recited in claim 5, wherein the second selectable control is accessible when the display housing is closed over the housing base to obscure the first display device.

7. A portable computing device as recited in claim 1, wherein the selectable control is a push-button.

8. A portable computing device as recited in claim 1, wherein the selectable control is a programmed keyboard input.

9. A portable computing device as recited in claim 1, wherein the selectable control is displayed as a user interface selectable control on the first display device.

10. A portable computing device, comprising:
    a display housing having at least a first side and a second side;
    an integrated display device in the first side of the display housing and configured to display one or more images;
    a non-volatile display device integrated into the second side of the display housing and configured to display any of the one or more images when the display housing is positioned to obscure the integrated display device, the non-volatile display device further configured to maintain the one or more images for display without power applied; and
    a selectable control configured to initiate that an image displayed on the integrated display device be duplicated for display on the non-volatile display device.

11. A portable computing device as recited in claim 10, further comprising a housing base coupled to the display housing and configured to house components of the portable computing device.

12. A portable computing device as recited in claim 11, further comprising:
    a memory component configured to maintain image data corresponding to a second image;
    a second selectable control configured to initiate that the second image be generated for display on the non-volatile display device, the second selectable control being accessible when the display housing is positioned over the housing base to obscure the integrated display device and the selectable control.

13. A portable computing device as recited in claim 10, further comprising:
    a memory component configured to maintain image data corresponding to a second image; and
    a second selectable control configured to initiate that the second image be generated for display on the non-volatile display device, the second selectable control being accessible when the display housing is positioned to obscure the integrated display device.

14. A portable computing device as recited in claim 10, further comprising an application program configured to copy the image displayed on the integrated display device to the non-volatile display device.

15. A portable computing device as recited in claim 14, wherein the application program is further configured to copy each bit of image data corresponding to the image displayed on the integrated display device.

16. A portable computing device as recited in claim 14, further comprising a memory component configured to maintain image data, and wherein the application program is further configured to copy the image data corresponding to a second image displayed on the integrated display device to the memory component.

17. A portable computing device as recited in claim 14, further comprising:
    a memory component configured to maintain image data, wherein the application program is further configured to copy the image data corresponding to a second image displayed on the integrated display device to the memory component; and
    a second selectable control configured to initiate that the application program generate the second image for display on the non-volatile display device.

18. A portable computing device as recited in claim 10, wherein the selectable control is a push-button.

19. A portable computing device as recited in claim 10, wherein the selectable control is a programmed keyboard input.

20. A portable computing device as recited in claim 10, wherein the selectable control is displayed as a user interface selectable control on the integrated display device.

21. A method, comprising:
    displaying an image on a first display device that is integrated into a first side of a display housing for a portable computer;
    receiving a selectable control input to initiate copying the image to a second display device that is integrated into a second side of the display housing;
    copying image data corresponding to the image displayed on the first display device; and
    displaying the image on the second display device such that the image is viewable when the display housing is positioned to obscure the first display device, and such that the image is maintained for display on the second display device without power applied.

22. A method as recited in claim 21, wherein displaying includes maintaining the image for display on a non-volatile display device without power applied.

23. A method as recited in claim 21, wherein copying includes copying each bit of image data corresponding to the image displayed on the first display device.

24. A method as recited in claim 21, wherein copying includes reading each bit of image data corresponding to the image displayed on the first display device, and wherein displaying includes writing each bit of image data to the second display device.

25. A method as recited in claim 21, wherein copying includes acquiring the image data as it is communicated to the first display device for display on the second display device.

26. A method as recited in claim 21, wherein receiving the selectable control input includes receiving a programmed keyboard input.

27. A method as recited in claim 21, further comprising receiving a second selectable control input to initiate copying image data corresponding to a second image displayed on the first display device to a memory component.

28. A method as recited in claim 21, further comprising:
    receiving a second selectable control input to display a second image on the second display device, wherein image data corresponding to the second image is maintained with a memory component;
    applying power to generate the second image for display on the second display device; and removing power such that the second image display is maintained on the second display device without power applied.

29. One or more computer-readable media comprising computer executable instructions that, when executed, direct a portable computing device to:
  display an image on an integrated display device that is integrated in a first side of a display housing for the portable computing device;
  receive an input to initiate copying the image displayed on the integrated display device to a non-volatile display device that is integrated into a second side of the display housing;
  read image data corresponding to the image displayed on the integrated display device; and
  write the image data corresponding to the image for display on the non-volatile display device such that the image is viewable when the display housing is positioned to obscure the integrated display device.

30. One or more computer-readable media as recited in claim 29, further comprising computer executable instructions that, when executed, direct the portable computing device to remove power from components in the portable computing device such that the image is maintained for display on the non-volatile display device without the power applied.

31. One or more computer-readable media as recited in claim 29, further comprising computer executable instructions that, when executed, direct the portable computing device to:
  receive a second input to initiate displaying a second image on the non-volatile display device;
  apply power to components in the portable computing device;
  generate the second image from image data maintained with a memory component; and
  remove power from the components in the portable computing device such that the second image is maintained for display on the non-volatile display device without the power applied.

* * * * *